United States Patent [19]

Silverman

[11] Patent Number: 4,937,045

[45] Date of Patent: Jun. 26, 1990

[54] HIGH-SPEED SOLDER COMPOSITIONS

[75] Inventor: Robert M. Silverman, Springfield, N.J.

[73] Assignee: M. C. Canfield Sons, Union, N.J.

[21] Appl. No.: 470,337

[22] Filed: Jan. 25, 1990

[51] Int. Cl.$^5$ ............................................. C22C 13/02
[52] U.S. Cl. ................................................... 420/559
[58] Field of Search .......................................... 420/559

[56] References Cited

U.S. PATENT DOCUMENTS

Re. 29,563  3/1978  Manko ................................. 420/559
1,087,561  2/1914  Tebbetts ............................... 420/559

Primary Examiner—Peter D. Rosenberg
Attorney, Agent, or Firm—Cobrin, Feingertz & Gittes

[57] ABSTRACT

A solder composition for use in high-speed hand-soldering of art work or other artifacts consisting essentially of from about 51% to about 56% by weight tin, from about a trace to about 1.0% by weight antimony, and the balance being substantially lead.

11 Claims, No Drawings

HIGH-SPEED SOLDER COMPOSITIONS

BACKGROUND OF THE INVENTION

The invention relates generally to soldering alloys, and more specifically to soldering alloy compositions useful in hand-soldering of art work or other artifacts where there is a continuing need for soldering compositions which give a bright, smooth finish. High-speed hand-soldering also requires a composition which solidifies rapidly.

A solder can be broadly defined as a fusible metal alloy composition used to bond or coat metals. Solders having distinctly different properties can be obtained by using different combinations of metals, and by varying the relative proportions of each metal. One of the most widely employed solders is a binary composition comprising tin and lead. The relative amounts of tin and lead in tin-lead solder compositions can be varied over relatively wide limits. However, a commonly employed tin-lead solder composition generally comprises about 60% by weight tin with the remainder being lead. Solders containing 50% tin are also well known.

Binary solder compositions are satisfactory for many applications such as bonding together sheet metal parts, and bonding electronic components to circuit boards. Solder compositions can be in the form of a wire, rod or stick and can be melted by a soldering iron, torch, heating wires or the like.

U.S. patent Reissue No. 29,563 (Manko) discloses solder compositions which are useful in automated soldering processes, which solders, in one embodiment, consist essentially of approximately 55% by weight tin, 2.77% by weight antimony, with the remainder being substantially lead. In another embodiment, the preferred composition consists essentially of approximately 52% by weight tin, 3% by weight antimony, with the remainder being substantially lead. The solder compositions are used in liquid form and are retained in a molten state in a reservoir for use in an automated soldering operation. The above-cited patent does not suggest using the disclosed solder compositions in hand soldering operations. Also, in all embodiments, the disclosed compositions contain relatively high amounts of antimony i.e., greater than 1.5% by weight.

U.S. Pat. No. 3,607,252 (North) discloses soldering compositions consisting essentially of 58% to 60% by weight tin, 34.3% to 37.7% lead, 3.8% to 4.2% antimony, and 0.5% to 1.5% copper. The solders disclosed in that patent contain relatively high amounts of antimony and copper and are intended for use in the assembly of products which require both electrical and mechanical connections.

U.S. Pat. No. 4,588,657 (Kujas) discloses solder compositions consisting essentially of about 55% by weight to 65% by weight tin, about 2% by weight to 3.9% by weight calcium and the balance being substantially lead. No antimony is present in the solders.

An ideal composition for many soldering purposes is the tin-lead eutectic, i.e. an alloy which is nominally 63% by weight tin and 37% by weight lead. The eutectic has a sharp melting point at 182.8° C. Use of such a eutectic composition results in fine-grained joints having excellent mechanical properties. However, for many applications, a 63% tin–37% lead solder alloy is less than ideal.

For example, it would be desireable to have a low cost solder alloy composition for articles of manufacture of a decorative or artistic nature utilizing solder alloys to produce a seam, joint or line having a bright, smooth finish and high rounded bead or crown. Such a low cost solder alloy composition should have all the desirable properties of the tin-lead eutectic composition, but with reduced tin content because of the very high cost of tin. It would also be desirable to have a solder alloy that would exhibit excellent handling characteristics so as to facilitate high speed hand soldering operations, and yet result in a bright, smooth joint having good tensile strength.

SUMMARY OF THE INVENTION

It has been discovered that outstanding results for producing decorative products and artifacts are obtained in hand-soldering operations when a composition consisting essentially of from about 51% by weight to 56% by weight tin, about a trace to about 1.0% by weight antimony, and the balance being substantially lead is employed as the solder alloy. Such a soldering composition renders a bright, smooth joint having good strength combined with the unique and useful property of rapid solidification and is especially useful in the manufacturing of stained glass artifacts and other artistic designs. The composition is very cost effective because of the reduced amount of tin, which is expensive relative to the cost of lead.

DETAILED DESCRIPTION

The solder composition of the present invention consists essentially of from about 51% by weight to about 56% by weight tin, from about a trace to about 1.0% by weight antimony, and the balance being substantially lead. In a preferred embodiment, the compositions consists essentially of from about 51% by weight to about 54% by weight tin, from about a trace to about 0.5% by weight antimony, and the balance being substantially lead. Most preferably, the composition consists essentially of about 52% by weight tin, about 47.75% by weight lead, and about 0.15% by weight antimony.

The compositions of the present invention exhibit outstanding physical properties for decorative products and artifacts. They flow well when melted, bead very well, are characterized by joints having a bright and smooth finish, cool rapidly, and provide a solid joint with good tensile strength. It is especially noteworthy that when employed in hand-soldering operations, the present alloy compositions solidify rapidly even at the corners of the soldered product where there is a relatively large mass of molten solder. This unexpected result allows for high-speed hand-soldering operations with improved product quality and increased productivity.

Although useful in a variety of soldering operations, the compositions of the present invention are particularly useful when employed in stained glass manufacturing which calls for functional yet artistically pleasing soldered joints. Quality joints having high tensile strength and very bright, shiny surfaces are obtained when the present compositions are employed.

Beading or crowning relates to the surface tension of the molten solder versus the wetting force between the molten alloy and a substrate material. It is artistically desirable to have high beading in solder compositions that are to be used in hand soldering operations on decorative products. Compositions having over about 56% by weight tin do not exhibit good bead characteristics because there is an increase in wetting forces without corresponding increases in surface tension. It has also been observed that solder compositions having an antimony content of about 2% by weight or greater do not exhibit good bead characteristics. On the contrary, it has been observed that the solder composition of the present invention exhibits remarkably good beading properties. Although not wishing to be bound by theory, good beading in the solder composition of the present invention is believed to be attributable to the combination of a tin content of from about 50% by weight to 56% by weight and an antimony content of less than about 2% by weight.

Another desirable characteristic of a solder composition is rapid set-up or solidification. Solidification of an alloy occurs when the alloy cools from a molten state to a temperature at which it is in the completely solid state. In the process of solidifying, an alloy releases its heat. The quantity of heat is determined by thermal capacity in the molten state and its heat of fusion. Tin has a heat of fusion of 14.5 calories per gram and a specific heat in the molten state of 0.063 calories/gram/° C. Lead has a heat of fusion of 6.3 calories per gram and a specific heat in the molten state of 0.031 calories/gram/° C. Since tin is characterized by a higher heat of fusion than lead, a reduced amount of tin in a tin-led alloy lowers the amount of heat necessary to be removed for solidification of a given tin-lead alloy. However, the melting temperature of a tin-lead alloy increases with decreasing tin content; therefore, a greater amount of heat must be removed to obtain solidification. The solder composition of the present invention is the optimum balancing lower tin with increased melting temperature while providing the highest speed of solidification.

The following table illustrates various solder compositions that have been prepared and tested in hand-soldering operations. In each case copper foil was wrapped on glass and a wire comprising the solder composition was employed utilizing a hand-held soldering gun to liquify the solder composition. All of the alloys flowed well and exhibited a bright finish when solidified. Good beading was observed in all alloy compositions from Composition 1 through Composition 8. Compositions 11 (comparison) and 12 (comparison) did not bead as well because of the high content of tin (60% and 63%, respectively). Compositions 9 (comparison) and 10 (comparison) did not bead as well because of the high content of antimony (2% by weight). All of the compositions, except Compositions 9 (comparison) and 10 (comparison) solidified rapidly. Because of the relatively high antimony content (2% by weight), Compositions 9 (comparison) and 10 (comparison) did not solidify rapidly. Compositions 1 and 5 also did not solidify as rapidly due to the higher melting temperature.

TABLE

| Alloy Composition | Tin (wt. %) | Antimony (wt. %) | Lead (wt. %) |
|---|---|---|---|
| 1 | 50 | 1.0 | 49 |
| 2 | 52 | 1.0 | 47 |
| 3 | 54 | 1.0 | 45 |
| 4 | 56 | 1.0 | 43 |
| 5 | 50 | 0.2 | 49.8 |
| 6 | 52 | 0.2 | 47.8 |
| 7 | 54 | 0.2 | 45.8 |
| 8 | 56 | 0.2 | 43.8 |
| 9 (comparison) | 52 | 2.0 | 46 |
| 10 (comparison) | 54 | 2.0 | 44 |
| 11 (comparison) | 60 | 0.4 | 39.6 |
| 12 (comparison) | 63 | 0.1 | 36.9 |

A composition consisting essentially of the tin-lead eutectic (63% by weight tin and 37% by weight lead) has rapid solidification after melting because the solder is at the eutectic point in the tin/lead alloy range and thus changes from liquid to solid without a so-called "pasty" range. It has been discovered that the solder composition of the present invention has a rate of solidification which is comparable or better than the solidification speed of the tin-lead eutectic. In a preferred embodiment, the present solder composition consists essentially of from about 51.5% by weight to 52.5% by weight tin, about a trace to 0.5% by weight antimony, and the balance being substantially lead. In an alternative embodiment, the solder composition comprises about 52% by weight to 56% by weight tin, about 0.2% by weight to 1.0% by weight antimony, and the balance being substantially lead.

Preferably, the solder composition of the present invention should consist of only pure tin, lead and antimony. It is, however, possible to have minor amounts of other metals or non-metallic materials in the solder, either as impurities or additives, provided that the additional materials are either substantially inert or do not adversely affect the desirable properties of the resulting solder alloy, such as good bead, rapid' solidification brightness of finish and the like.

While the present inventive concept relating to a solder alloy composition has been explained in the preceding paragraphs, and table, it is to be understood that the foregoing description is merely illustrative of the invention which is set forth in the following claims:

What we claim is:

1. A decorative article of manufacture including a glass member and having a solder bead, said solder bead cooperating in securing said glass member in the article of manufacture, said solder bead consisting essentially of from about 51% by weight to about 56% by weight tin, from about a trace to about 1.0% by weight antimony, and the balance being substantially lead.

2. A decorative article of manufacture according to claim 1, wherein said solder bead contains minor amounts of substantially inert metallic or non-metallic materials.

3. A decorative article of manufacture according to claim 1, wherein said solder bead consists essentially of from about 51% to about 54% tin, up to about 0.5% antimony and the balance being substantially lead.

4. A decorative article of manufacture including a glass member and having a solder bead, said solder bead cooperating in securing said glass member in the article of manufacture, said solder bead consisting essentially of about 51.5% by weight to about 52.5% by weight tin, about a trace to about 0.5% by weight antimony, and the balance being substantially lead.

5. A decorative article of manufacture including a glass member and having a solder bead, said solder bead cooperating in securing said glass member in the article of manufacture, said solder bead consisting essentially of about 52% by weight to 56% by weight tin, about 0.2% by weight to 1.0% by weight antimony, and the balance being substantially lead.

6. A decorative article of manufacture according to claim 5, said bead consisting essentially of about 51.5% weight to 52.5% by weight tin, about a trace to about 0.5% by weight antimony, and the balance being substantially lead.

7. A decorative article of manufacture according to claim 6, said bead consisting essentially of about 52% by weight tin, about 0.15% by weight antimony, and about 47.75% by weight lead.

8. A decorative article of manufacture according to claim 5, wherein said bead contains minor amounts of substantially inert metallic or non-metallic materials.

9. A method of making a decorative article of manufacture which includes a glass member, said method including the step of using a solder to secure said glass member in the article of manufacture, said solder consisting essentially of from about 51% by weight to about 56% by weight tin, from a trace amount to about 1% by weight antimony, and the balance being substantially lead.

10. A method according to claim 9 wherein the solder consists essentially of from about 51% to about 54% tin, up to about 0.5 antimony, an the balance being substantially lead.

11. A method according to claim 9 wherein the solder consists essentially of about 51.5% by weight to about 52.5% by weight tin, about a trace to about 0.5% by weight antimony, and the balance being substantially lead.

* * * * *